US011129102B2

(12) United States Patent
Agrawal et al.

(10) Patent No.: US 11,129,102 B2
(45) Date of Patent: Sep. 21, 2021

(54) METHOD AND SYSTEM TO REDUCE USER EQUIPMENT BATTERY CONSUMPTION AND EFFICIENTLY UTILIZE UPLINK HARQ MEMORY

(71) Applicant: Samsung Electronics Co., Ltd., Gyeonggi-do (KR)

(72) Inventors: Mayank Kailash Agrawal, Bangalore (IN); Satya Kumar Vankayala, Bangalore (IN); Fasil Abdul Latheef, Bangalore (IN); V V N K Someswara Rao Koduri, Bangalore (IN); Uma Kishore Satya Venkata Godavarti, Bangalore (IN)

(73) Assignee: Samsung Electronics Co., Ltd

( * ) Notice: Subject to any disclaimer, the term of this patent is extended or adjusted under 35 U.S.C. 154(b) by 2 days.

(21) Appl. No.: 16/673,229

(22) Filed: Nov. 4, 2019

(65) Prior Publication Data

US 2020/0145922 A1   May 7, 2020

(30) Foreign Application Priority Data

Nov. 2, 2018  (IN) .................. IN201841041644 PS
Aug. 7, 2019  (IN) .................. IN201841041644 CS (51) Int. Cl.
  *H04W 52/02* (2009.01)
  *H04L 1/18* (2006.01)
  (Continued)

(52) U.S. Cl.
  CPC ...... *H04W 52/0229* (2013.01); *H04B 17/309* (2015.01); *H04L 1/1812* (2013.01); *H04W 24/08* (2013.01); *H04W 76/28* (2018.02)

(58) Field of Classification Search
  CPC . H04W 52/0229; H04W 76/28; H04W 24/08; H04W 52/0216; H04W 72/1242;
  (Continued)

(56) References Cited

U.S. PATENT DOCUMENTS

2011/0026625 A1  2/2011 Susitaival et al.
2012/0314637 A1  12/2012 Kim et al.
(Continued)

FOREIGN PATENT DOCUMENTS

KR   1020110052426   5/2011
WO   WO 2009/136830   11/2009
(Continued)

OTHER PUBLICATIONS

Huawei, HiSilicon, "Introduction of Enhanced LAA for LTE", R2-162997, 3GPP TSG-RAN2 Meeting #93-bis, Apr. 11-15, 2016, 7 pages.
(Continued)

*Primary Examiner* — Ayaz R Sheikh
*Assistant Examiner* — Louis Samara
(74) *Attorney, Agent, or Firm* — The Farrell Law Firm, P.C.

(57) ABSTRACT

Disclosed is a method and system to reduce user equipment (UE) battery consumption and efficiently utilize uplink hybrid automatic repeat request (HARQ) memory, including sending uplink data to a base station and saving a backup copy of the uplink data in an uplink HARQ buffer, receiving an acknowledgement from the base station indicating that the uplink data has been received, measuring a HARQ retransmission time required to retransmit the uplink data to the base station after receiving the acknowledgement, comparing the measured HARQ retransmission time to a remaining discontinuous reception cycle, and removing the uplink data from the uplink HARQ buffer after expiration of an
(Continued)

inactivity timer and switching the UE to a sleep mode based on the comparison.

16 Claims, 6 Drawing Sheets

(51) Int. Cl.
*H04B 17/309* (2015.01)
*H04W 76/28* (2018.01)
*H04W 24/08* (2009.01)

(58) Field of Classification Search
CPC ............ H04W 12/0433; H04B 17/309; H04L 1/1812; H04L 1/1896; H04L 5/0094; H04L 5/0048
See application file for complete search history.

(56) References Cited

U.S. PATENT DOCUMENTS

| | | | |
|---|---|---|---|
| 2013/0053103 A1 | 2/2013 | Kim et al. | |
| 2014/0269397 A1* | 9/2014 | Pelletier | H04W 52/0216 370/252 |
| 2015/0173122 A1 | 6/2015 | Schliwa-Bertling et al. | |
| 2016/0081110 A1* | 3/2016 | Suzuki | H04L 5/0094 370/336 |
| 2017/0280377 A1* | 9/2017 | Patil | H04W 12/0433 |
| 2018/0048498 A1* | 2/2018 | Stern-Berkowitz | H04L 5/0048 |
| 2019/0116548 A1* | 4/2019 | Dudzinski | H04B 7/088 |
| 2019/0208538 A1 | 7/2019 | Lee et al. | |
| 2020/0195386 A1* | 6/2020 | Marinier | H04L 1/1896 |
| 2020/0281000 A1* | 9/2020 | Loehr | H04W 72/1242 |

FOREIGN PATENT DOCUMENTS

| | | |
|---|---|---|
| WO | WO 2012/138155 | 1/2013 |
| WO | WO 2018/174456 | 9/2018 |

OTHER PUBLICATIONS

International Search Report dated Feb. 13, 2020 issued in counterpart application No. PCT/KR2019/014850, 7 pages.
Indian Examination Report dated Aug. 2, 2021 issued in counterpart application No. 201841041644, 6 pages.

* cited by examiner

METHOD AND SYSTEM TO REDUCE USER EQUIPMENT BATTERY CONSUMPTION AND EFFICIENTLY UTILIZE UPLINK HARQ MEMORY

CROSS-REFERENCE TO RELATED APPLICATION(S)

This application is based on and claims priority under 35 U.S.C. § 119 to Indian Provisional Patent Application No. 201841041644 (PS) filed on Nov. 2, 2018 and Indian Complete Patent Application No. 201841041644 (CS), filed on Aug. 7, 2019, in the Indian Patent Office, the disclosures of which are incorporated herein by reference in their entireties.

BACKGROUND

1, Field

The disclosure relates generally to a radio access network in wireless communication, and more particularly, to battery consumption of a user equipment (UE) and uplink hybrid automatic repeat request (HARQ) buffer memory management in wireless communication.

2. Description of the Related Art

To meet the demand for wireless data traffic, which has increased since deployment of fourth generation (4G) communication systems, efforts have been made to develop an improved fifth generation (5G or pre-5G communication system, also referred to as a "beyond 4G network" or a "post long term evolution (LTE) system". The 5G communication system is considered to be implemented in higher frequency millimeter wave (mmWave) bands, e.g., 60 gigahertz (GHz) bands, so as to achieve higher data rates.

To decrease propagation loss of the radio waves and increase the transmission distance, techniques such as beamforming, massive multiple-input multiple-output (mMIMO), full dimensional MIMO (FD-MIMO), array antenna, analog beam forming, and large scale antenna are discussed in 5G communication systems. In addition, development for system network improvement in 5G communication systems is under way based on advanced small cells, cloud radio access networks (RANs), ultra-dense networks, device-to-device (D2D) communication, wireless backhaul, moving network, cooperative communication, coordinated multi-points (CoMP), and reception-end interference cancellation, for example. In the 5G system, hybrid frequency shift keying (FSK), frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving to the Internet of things (IoT) where distributed entities, such as things, exchange and process information without human intervention. The Internet of everything (IoE), which is a combination of IoT technology and big data processing technology through connection with a cloud server, has also emerged. As technology elements, such as sensing technology, wired/wireless communication and network infrastructure, service interface technology, and security technology have been demanded for IoT implementation, research is being conducted on a sensor network, a machine-to-machine (M2M) communication, machine type communication (MTC), for example. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Consistent with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered as an example of convergence between the 5G technology and IoT technology.

The existing UE implementation in the LTE, medium access control (MAC) specification leads to higher battery consumption in the UE for several reasons.

One such reason is because the HARQ mechanism operates at the physical (PHY) layer but is controlled by the MAC layer. When one or more pieces of received data have an error, the receiver buffers the one or more pieces of data and requests a re-transmission from a transmitter. When the receiver receives the re-transmitted data, the re-transmitted data is combined with buffered data prior to channel decoding and error detection. This enhances the performance of the re-transmissions.

Further, the transmitter (i.e., UE) also saves data sent in an uplink HARQ buffer for a long duration to correct one or more error data packets received by a base station as per the HARQ mechanism. Once a data packet is sent by a particular HARQ process, the UE waits for an acknowledgement/negative acknowledgement (ACK/NACK). Until the UE receives the ACK or NACK, the process will be inactive and no other packets are processed, which significantly reduces the processing time and impacts throughput.

The UE saves the data until at least one new data indicator (NDI) bit toggle is received for a same process identifier (ID) as part of a physical downlink control channel (PDCCH) grant or a maximum HARQ timer expires, which leads to unnecessary waste of UE battery life. The UE also occasionally wakes up in discontinuous reception (DRX) sleep and monitors the PDCCH to check whether a new grant with the NDI bit toggle is received or maximum HARQ retransmission attempts are completed, which also leads to unnecessary waste of UE battery life.

Hence, there is a need in the art for a method and system to reduce UE battery consumption and more efficiently utilize the uplink HARQ memory.

SUMMARY

Aspects of the disclosure are to address at least the above-mentioned problems and/or disadvantages and to provide at least the advantages described below. Accordingly, an aspect of the disclosure is to provide a technique to reduce battery consumption of a UE and improve the performance of the communication system based on a comparison of HARQ retransmission time and remaining DRX cycle time after the expiration of an inactivity timer.

In accordance with an aspect of the disclosure, a method for saving battery consumption of a user equipment includes transmitting uplink data to a network and storing the uplink data in an uplink HARQ buffer of the UE, wherein an inactivity timer is activated at a start of the transmission of the uplink data, receiving an ACK from the network for receipt of the transmitted uplink data, measuring a maximum HARQ retransmission time at the UE after receiving the ACK, comparing the measured HARQ retransmission time with a remaining DRX cycle time of the UE and determining a link state of the UE, switching, after expiration of the inactivity timer, the UE to a sleep mode and removing the uplink data from the uplink HARQ buffer when the HARQ retransmission time is less than the remaining DRX cycle time and the link state of the UE is less than a threshold value, and switching, after the expiration of the inactivity timer, the UE to a sleep mode when the HARQ retransmission time is greater than the remaining DRX cycle time of the UE and the link state of the UE is less than the threshold value.

In accordance with another aspect of the disclosure, an apparatus for wireless communication includes a processor configured to transmit uplink data to a network and store the uplink data in an uplink HARQ buffer of a UE, wherein an inactivity timer is activated at a start of the transmission of the uplink data, receive an ACK from the network for receipt of the transmitted uplink data, measure a HARQ retransmission time required to retransmit the uplink data to the network after receiving the acknowledgment, compare the measured HARQ retransmission time with a remaining DRX cycle time of the UE and determine a link state of the UE, switch, after expiration of the inactivity timer, the UE to a sleep mode and remove the uplink data from the uplink HARQ buffer when the HARQ retransmission time is less than the remaining DRX cycle time and the link state of the UE is less than a threshold value, and switch, after the expiration of the inactivity timer, the UE to a sleep mode when the HARQ retransmission time is greater than the remaining DRX cycle time of the UE and the link state of the UE is less than the threshold value.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Hereinafter, various embodiments will be described with reference to the accompanying drawings. Descriptions of known functions and/or configurations will be omitted for the sake of clarity and conciseness.

The accompanying drawings, which are incorporated in and constitute a part of this disclosure, illustrate embodiments and, together with the description, serve to explain aspects of the disclosure. In the figures, the same numbers are used throughout the figures to reference like features and components.

With respect to the use of any plural and/or singular terms herein, those having skill in the art can translate from the plural terms to the singular terms and vice-versa, as is appropriate to the context and/or application.

While the disclosure may have various modifications and alternative forms, embodiments are shown by way of example in the drawings and will be described in detail below. It should be understood, however, that this is not intended to limit the disclosure in any way, but on the contrary, the disclosure is intended to cover all modifications, equivalents, and alternatives falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of additional elements in the device, system, or apparatus.

Figure 1:
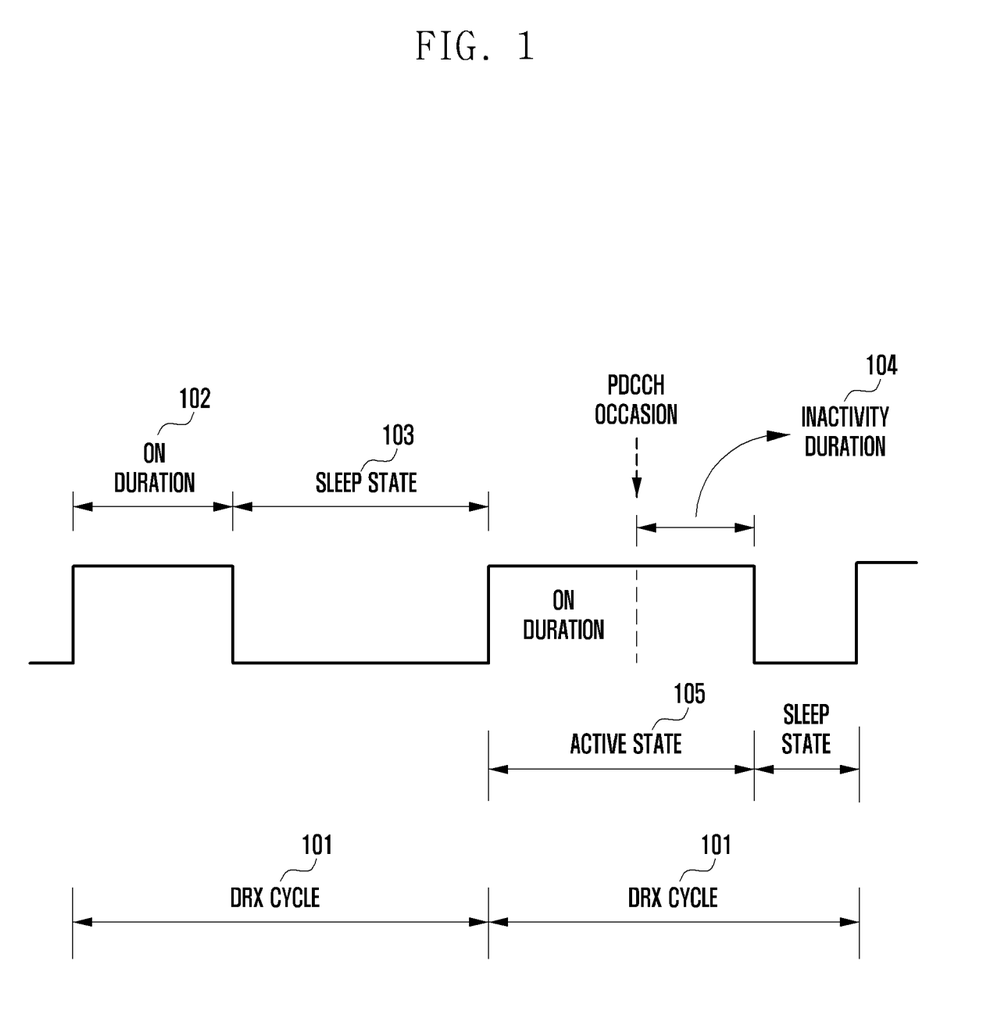
FIG. 1 illustrates a DRX cycle of a UE, according to an embodiment.

FIG. 1 illustrates a DRX cycle of the UE according to an embodiment.

As shown in FIG. 1, the DRX cycle 101 of the UE specifies a periodic repetition of "on duration" 102 followed by a possible period of inactivity which is referred to as the sleep state 103. The UE monitors for a PDCCH from a base station and after successfully receiving the PDCCH, a DRX inactivity timer 104 is started. The DRX inactivity timer specifies number of consecutive transmission time intervals (TTIs) during which the UE remains awake and also monitors for the PDCCH. The DRX inactivity timer is restarted when a new PDCCH transmission is detected while a DRX ON duration timer continues to run. Expiration of the DRX inactivity timer 104 indicates that a particular duration of inactivity has elapsed for receiving any PDCCH transmission.

Figure 2A:
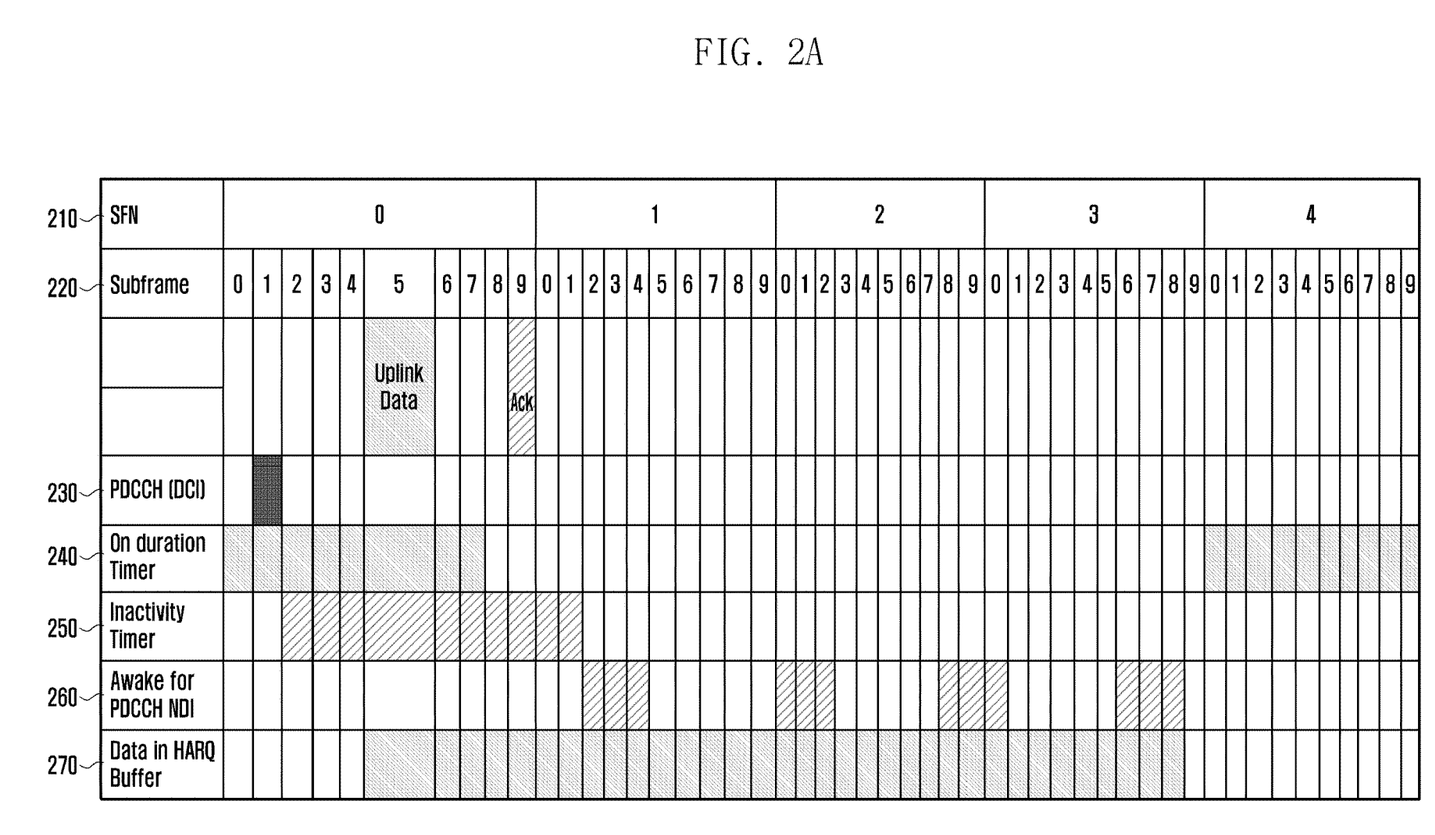
FIG. 2A illustrates when a UE stores a backup of data in an uplink HARQ buffer, to which the disclosure is applied.

FIG. 2A illustrates when a UE monitors a PDCCH for an NDI bit toggle and stores a backup of uplink data in an uplink HARQ buffer, to which the disclosure is applied.

As illustrated in FIG. 2A, the UE receives a PDCCH 230 from a base station and starts an inactivity timer 250. In response to receiving the PDCCH 230, the UE transmits uplink data to the base station, saves a backup of the uplink data in an uplink HARQ buffer 270 and then receives an ACK from the base station that indicates that the uplink data has been received by the base station. The UE will save the backup of the uplink data in the HARQ buffer 270 until at least one NDI bit toggle is received or a maximum HARQ timer expires, based on the 3GPP 36.321 specification of the HARQ process which describes that when receiving a HARQ ACK alone, the MAC entity saves the data in the HARQ buffer. The UE in the DRX, occasionally wakes up 260 to monitor the PDCCH 230 to check whether a new grant with an NDI toggle bit is received or maximum HARQ retransmission attempts are completed even after the inactivity timer 250 is expired and the UE is in DRX sleep state. However, this operation by the UE leads to unnecessary waste of UE battery life, due to storage of backup data in the uplink HARQ buffer even after the expiration of an inactivity timer. An SFN 210 indicates a subframe number, 220 indicates a subframe, and an on duration timer 240 is included in the PDCCH monitoring.

Figure 2B:
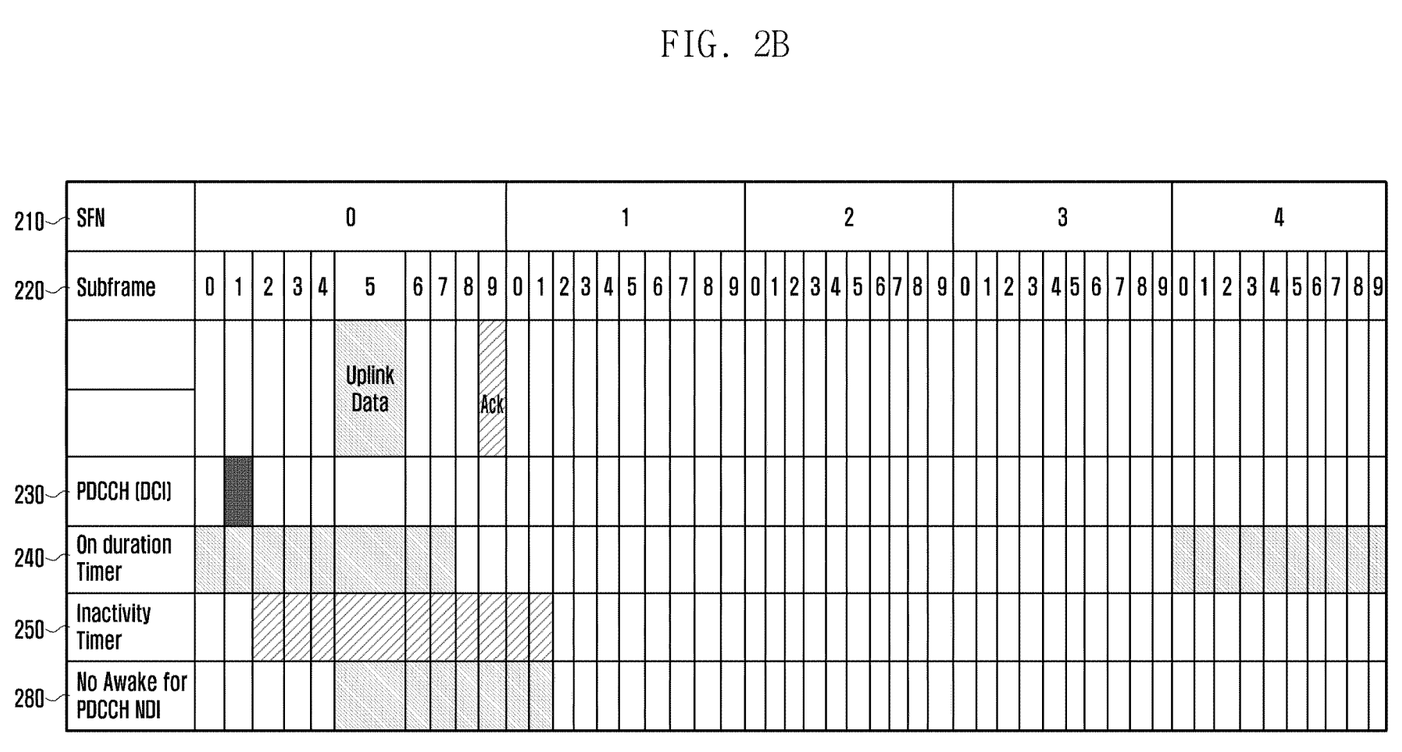
FIG. 2B illustrates when a UE enters the sleep state after expiration of an inactivity timer, according to an embodiment.

FIG. 2B illustrates when a UE is switched to asleep state after expiration of an inactivity timer, according to an embodiment.

In FIG. 2B, after the UE receives a PDCCH 230 from a base station and starts an inactivity timer 250, the UE transmits uplink data to the base station, saves a backup of the uplink data in an uplink HARQ buffer and then receives an acknowledgement from the base station that indicates that the uplink data has been received by the base station. In response to the reception of the acknowledgment and after expiration of the inactivity timer 250, the uplink data from the uplink HARQ buffer is removed and the UE enters the DRX sleep mode. Hence, the UE is able to save battery life consumed in awaking the RF module of the UE and also in monitoring the PDCCH 230 by switching the UE to the sleep state. No awake for PDCCH NDI 280 is included.

Figure 3:
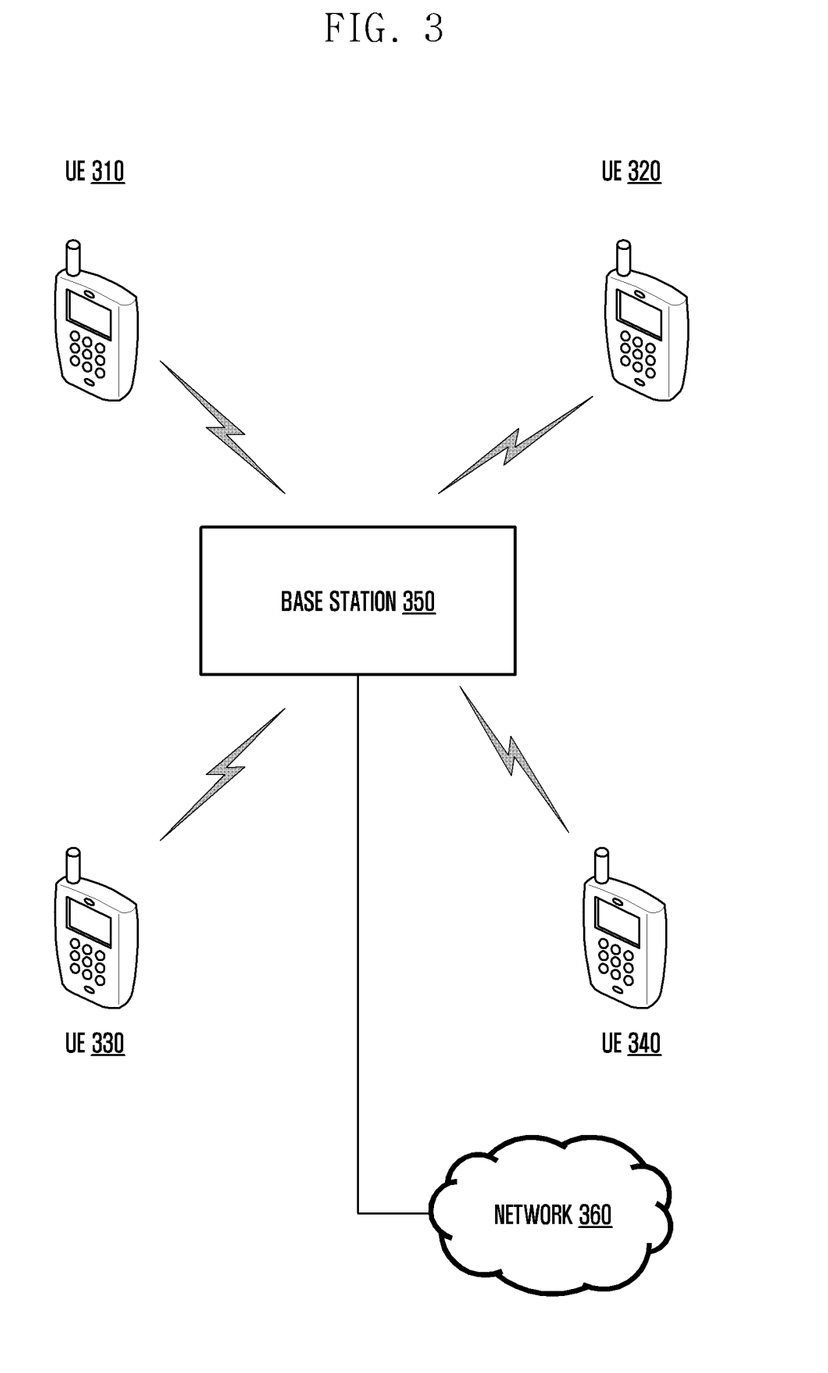
FIG. 3 illustrates an example of a wireless communication system including a plurality of UE's and a base station, according to an embodiment.

FIG. 3 illustrates a wireless communication system including a plurality of UEs and a base station, according to an embodiment.

As shown in FIG. 3, the plurality of UEs 310, 320, 330 and 340 are in communication with the base station 350, and the base station 350 is in communication with a network 360. The base station 350 may be referred to as a network. Although four UEs 310 to 340 and the base station 350 are shown in FIG. 3, it should be noted that any combination of these wireless devices may be included in the wireless communication system.

The base station 350 can include a transmit (Tx) data processor, a modulator, a transmitter unit, a processor, a receive (Rx) data processor, a demodulator, and a receiver unit. Similarly, each of the plurality of UEs includes a Tx data processor, a modulator, a transmitter unit, a processor, an Rx data processor, a demodulator, and a receiver unit.

The Tx data processor of the base station 350 receives, formats, codes, interleaves, and modulates traffic data and provides modulation symbols. The modulator of the base station 350 receives and processes the data symbols and pilot symbols and provides a stream of symbols. The modulator multiplexes data and pilot symbols on the proper sub bands, provides a signal value of zero for each unused sub band, and obtains a set of N transmit symbols for the N sub bands for each symbol period. Each transmit symbol may be a data symbol, a pilot symbol, or a signal value of zero. The pilot symbols may be sent continuously in each symbol period. The pilot symbols can be frequency division multi-plexed (FDM), orthogonal frequency division multiplexed (OFDM), time division multiplexed (TDM), frequency division multiplexed (FDM), or code division multiplexed (CDM).

In the case of an OFDM system, the modulator can transform each set of N transmit symbols to the time domain using an N-point IFFT to obtain a "transformed" symbol that contains N time-domain chips. The modulator typically repeats a portion of each transformed symbol to obtain a corresponding symbol. The repeated portion is referred to as a cyclic prefix and is used to combat delay spread in the wireless channel. The transmitter unit (TMTR) receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna to the plurality of UEs.

An antenna of each of the UEs 310-340 receives the downlink signal and provides a received signal to a receiver unit of the UE. The receiver unit conditions (e.g., filters, amplifies, and frequency down converts) the received signal and digitizes the conditioned signal to obtain samples. The demodulator of the UE removes the cyclic prefix appended to each symbol, transforms each received transformed symbol to the frequency domain using an N-point FFT, obtains N received symbols for the N sub bands for each symbol period, and provides received pilot symbols to a processor for channel estimation. The demodulator of the UE further receives a frequency response estimate for the downlink from processor, performs data demodulation on the received data symbols to obtain data symbol estimates of the transmitted data symbols, and provides the data symbol estimates to an RX data processor, which demodulates (i.e., symbol demaps), deinterleaves, and decodes the data symbol estimates to recover the transmitted traffic data.

On the uplink, a Tx data processor processes traffic data and provides data symbols. The modulator of the UE receives and multiplexes the data symbols with pilot symbols, performs modulation, and provides a stream of symbols. The pilot symbols may be transmitted on sub-bands that have been assigned to the UE for pilot transmission, where the number of pilot sub-bands for the uplink may be the same as or different from the number of pilot sub-bands for the downlink. The transmitter unit of the UE then receives and processes the stream of symbols to generate an uplink signal, which is transmitted by the antenna to the base station 350.

At base station 350, the uplink signal from the UE is received by the antenna and processed by a receiver unit to obtain samples. A demodulator then processes the samples and provides received pilot symbols and data symbol estimates for the uplink. An Rx data processor processes the data symbol estimates to recover the traffic data transmitted by terminal. A processor performs channel estimation for each active terminal transmitting on the uplink.

Figure 4:
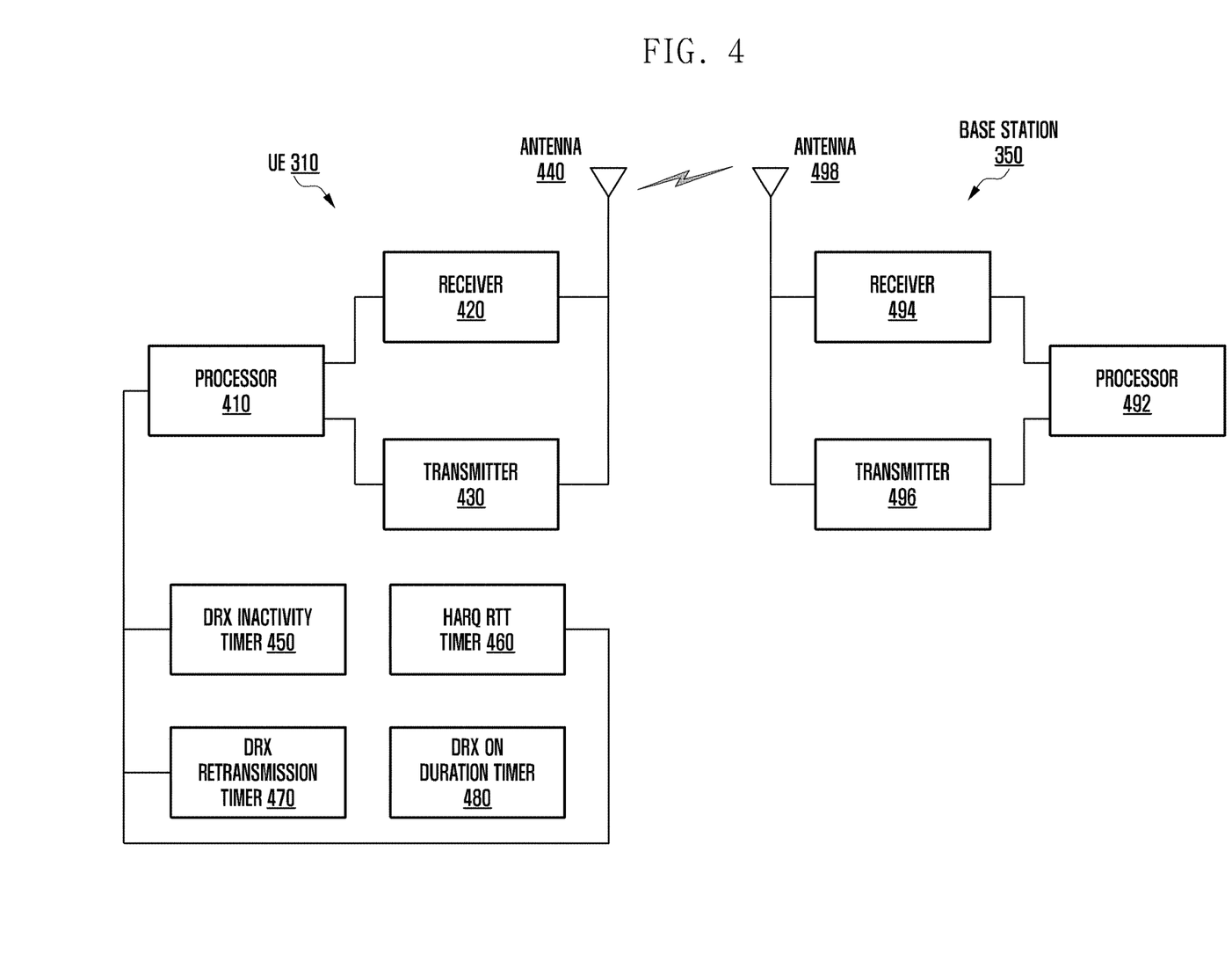
FIG. 4 is a block diagram of a UE and base station of FIG. 3.

FIG. 4 is a block diagram of the UE and the base station of the wireless communication system shown in FIG. 3.

As shown in FIG. 4, the UE 310 is in communication with the base station 350, which is also referred to as a network. In addition to the components that may be found in a typical UE, the UE 310 includes a processor 410, a receiver 420, a transmitter 430, and an antenna 440. The processor 410 is configured to perform the methods disclosed herein for reducing battery consumption in UE 310, in conjunction with the following DRX timers: a DRX inactivity timer 450, a HARQ round trip time (RTT) timer 460, a DRX retransmission timer 470, and a DRX ON duration timer 480. The receiver 420 and the transmitter 430 are in communication with the processor 410. The receiver 420 is configured to receive a PDCCH from a base station 350. The transmitter 430 is configured to transmit uplink data to the base station 350 in response to reception of the PDCCH. The processor 410 is configured to restart the DRX inactivity timer 450 in response to reception of the PDCCH, measure a maximum HARQ retransmission time using the DRX retransmission timer 470 to retransmit the uplink data to the base station 350 after receiving the acknowledgment from the base station 350. The processor 410 is further configured to compare the measured HARQ retransmission time with a remaining DRX cycle time, determine a link state of the UE 310, determine whether to switch, after the expiration of the inactivity timer, the UE 310 to a sleep state, and remove the uplink data from the HARQ buffer based on the comparison.

When the HARQ retransmission time is less than the remaining DRX cycle time and when the link state of the UE is less than a threshold, the processor 410 is configured to switch the UE to the sleep state and the uplink data is removed from the HARQ buffer. This reduces battery consumption of the UE 310 due to flushing of the HARQ buffer.

When the HARQ retransmission time is less than the remaining DRX cycle time and when the link state of the UE is greater than the threshold, the processor 410 is configured to monitor PDCCH until the expiration of inactivity timer, switch the UE to the sleep state after the inactivity timer is expired, and remove the uplink data from the HARQ buffer after the inactivity timer is expired and before the UE is switched to the sleep state.

When HARQ retransmission time is greater than the remaining DRX cycle time and when the link state of the UE 310 is less than a threshold value, the processor 410 is configured to switch the UE 310 to a sleep mode after inactivity timer expiration and the uplink data is removed from the HARQ buffer only after expiration of the measured HARQ retransmission time or an NDI bit toggle is received for the same process identifier (ID) and after the UE 310 is switched to an active mode in a next DRX active occasion.

When HARQ retransmission time is greater than the remaining DRX cycle time and when the link state of the UE is greater than a threshold, the processor 410 is configured to continue monitoring PDCCH occasions and remove the uplink data only in the next DRX active occasion after expiration of the measured HARQ retransmission time or the NDI bit toggle is received for the same process ID.

The link state of the UE is based on a link quality metric which indicates a UE misdetection of a NACK transmitted from the network as an ACK.

The link quality metric is determined based on at least one of reference signal received power (RSRP), signal to interference noise ratio (SINR), power headroom (PHR), and block error rate (BLER). The link quality metric is an integer ranging from 0 to 4. The value of link quality metric '0' or '1' indicates a good RF condition for transmission of data and the value of link quality metric '3' or '4' indicates a bad RF condition for transmission of data.

Table 1 below describes a link quality metric based on RSRP, SINR, PHR, and BLER.

TABLE 1

| Link Quality Matrix State | Criteria |
| --- | --- |
| 0 (very good RF) | RSRP > −75, SINR > 20 dB, PHR > 50, BLER < 5% |
| 1 (good RF) | RSRP > −85, SINR > 16 dB, PHR > 40, BLER < 7% |
| 2 (medium RF) | RSRP > −95, SINR > 12 dB, PHR > 35, BLER < 9% |
| 3 (bad RF) | RSRP > −110, SINR > 7 dB, PHR > 28, BLER < 11% |
| 4 (very bad RF) | RSRP < −120, SINR < 0 dB, PHR < 23 |

The link quality metric is determined based on at least one of average BLER of the UE, average BLER on a specific subframe index on which the PHICH data for the uplink transmission is being monitored, average BLER on a specific HARQ process number on which the uplink data was transmitted. The link quality metric is also determined based on at least one of BLER history and number of NACKs received for the last few uplink transmissions. When BLER is high, the link quality metric indicates a weak channel.

The antenna 440 is in communication with both the receiver 420 and the transmitter 430 to facilitate the transmission and reception of wireless data.

In addition to the components that may be found in a typical base station 350, the base station 350 includes a processor 492, a receiver 494, a transmitter 496, and an antenna 498. The processor 492 is configured to transmit a PDDCH and to transmit an ACK for the uplink data transmitted from the UE 310. The receiver 494 and the transmitter 496 are in communication with the processor 492. The antenna 498 is in communication with both the receiver 494 and the transmitter 496 to facilitate the transmission and reception of wireless data.

Figure 5:
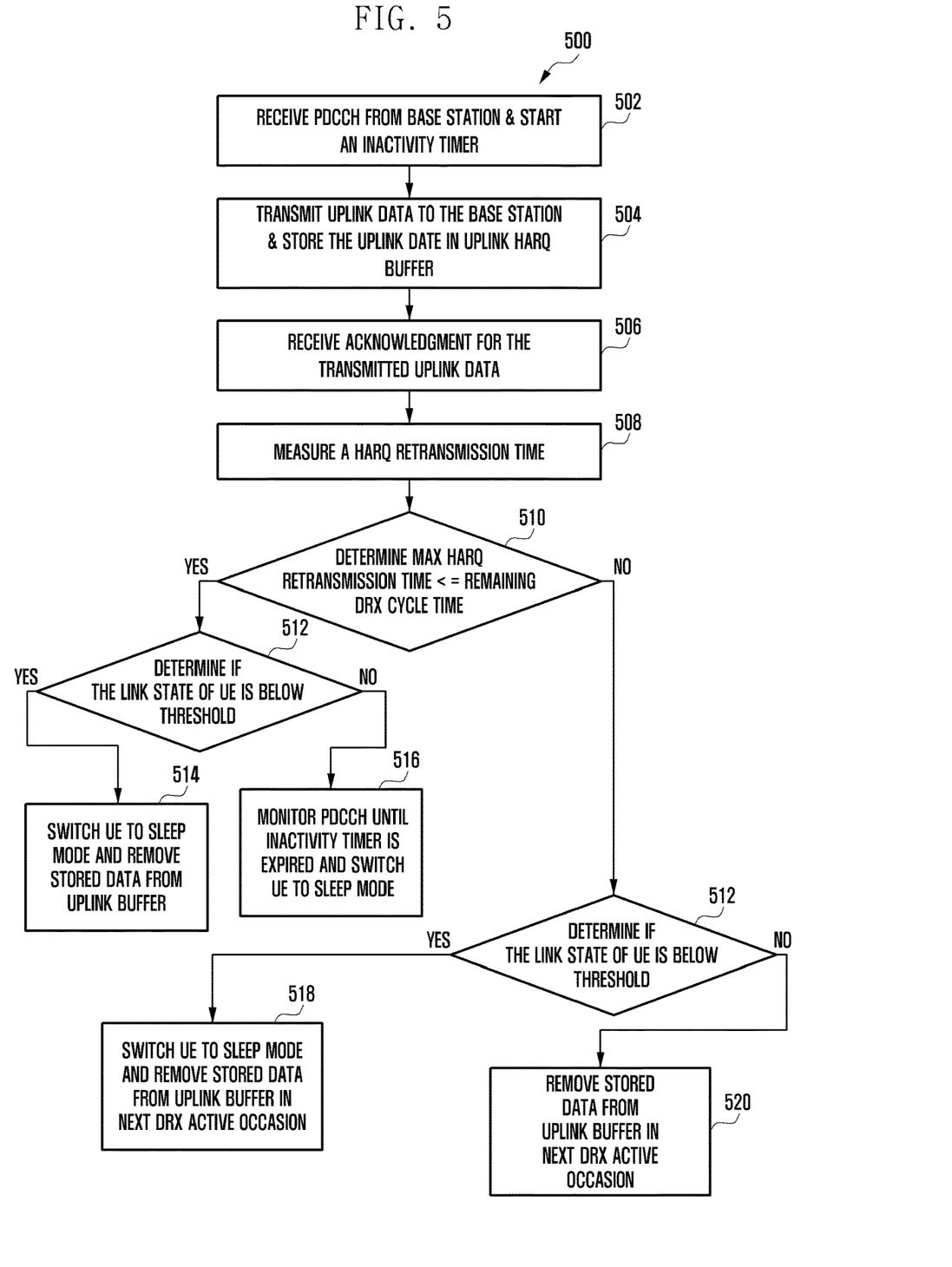
FIG. 5 illustrates a flowchart of a method for reducing UE battery consumption, according to an embodiment.

FIG. 5 illustrates a method 500 of saving battery consumption of a user equipment, according to an embodiment.

At step 502, the UE 310 receives a PDCCH from a base station 350 for the transmission of uplink data, and an inactivity timer is started in response to reception of the PDCCH, which extends the "on duration" of the UE.

At step 504, the uplink data is transmitted from the UE 310 to the base station 350 in response to a reception of the PDCCH and a backup of the transmitted uplink data is stored in the uplink HARQ buffer.

At step 506, the UE 310 receives an ACK from the base station 350 for the transmitted uplink data. The ACK indicates that the uplink data transmitted from the UE 310 is successfully received at the base station 350.

At step 508, a maximum (max) HARQ retransmission time is measured to know how long the UE will save a data copy in the uplink HARQ buffer based on the number of HARQ retransmissions configured for the UE 310 by the base station 350 after receiving the ACK from the base station 350.

At steps 510 and 512, it is determined whether the measured max HARQ retransmission time is less than or equal to the remaining DRX cycle time of the UE 310. If so, at step 512, also it is determined whether a link state of the UE 310 is less than a threshold. The link state of the UE is determined based on a link quality metric which indicates UE misdetection of a (NACK transmitted from the network as an ACK.

The link quality metric is determined based on at least one of RSRP, SINR, PHR, and BLER.

The link quality metric is an integer ranging from 0 to 4. The value of link quality metric '0' or '1' indicates a good RF condition for transmission of data and the value of link quality metric '3' or '4' indicates a bad RF condition for transmission of data.

Table 2 below describes a link quality metric based on RSRP, SINR, PHR, and BLER.

TABLE 2

| Link Quality Matrix State | Criteria |
| --- | --- |
| 0 (very good RF) | RSRP > −75, SINR > 20 dB, PHR > 50, BLER < 5% |
| 1 (good RF) | RSRP > −85, SINR > 16 dB, PHR > 40, BLER < 7% |
| 2 (medium RF) | RSRP > −95, SINR > 12 dB, PHR > 35, BLER < 9% |
| 3 (bad RF) | RSRP > −110, SINR > 7 dB, PHR > 28, BLER < 11% |
| 4 (very bad RF) | RSRP < −120, SINR < 0 dB, PHR < 23 |

The link quality metric is determined based on at least one of average BLER of the UE, average BLER on a specific subframe index on which the PHICH data for the uplink transmission is being monitored, average BLER on a specific HARQ process number on which the uplink data was transmitted, and at least one of BLER history and number of NACKs received for the last few uplink transmissions. When the BLER is high, the link quality metric indicates a weak channel.

At step 514, after expiration of an inactivity timer, when the measured HARQ retransmission time is less than or equal to the remaining DRX cycle time and when the link state of UE is below threshold, the UE 310 is switched to a sleep mode and the uplink data is removed from the uplink HARQ buffer.

At step 516, when the measured HARQ retransmission time is less than or equal to the remaining DRX cycle time and when the link state of UE is greater than the threshold, the UE is configured to monitor the PDCCH until expiration of the inactivity timer and the UE is switched to the sleep state after the expiration of the inactivity timer.

At step 518, after expiration of an inactivity timer and when the measured HARQ retransmission time is greater than the remaining DRX cycle time and the link state of the UE 310 is less than a threshold, the UE 310 is switched to a sleep mode and the uplink date is removed from the HARQ buffer after expiration of the measured HARQ retransmission time or an NDI bit toggle is received for the same process ID and after the UE 310 is switched to an active mode in next DRX active occasion.

At step 520, when the measured HARQ retransmission time is greater than the remaining DRX cycle time and the link state of the UE is greater than the threshold, the UE 310 will follow the current protocol of waking up occasionally to monitor the PDCCH in the DRX sleep state and the uplink date is removed from the HARQ buffer in next DRX active occasion only after a max HARQ retransmission timer expiration or the NDI bit toggle is received for that process ID.

The following are examples of application of the embodiments described above to various DRX cycle energy saving situations.

Example 1: Energy Saving for a DRX Cycle of 40 ms

Consider a DRX cycle length of 40 milliseconds (ms), an "on" duration timer of 4 ms, and an inactivity timer of 10 ms.

When the max HARQ value is 4, only 3 retransmissions will remain during inactivity expiration. The maximum HARQ retransmission time is computed in the manner taught above will be equal to 8*3=24 ms. Next, the maximum HARQ retransmission time of 24 ms is compared with the remaining DRX cycle of 30 ms i.e., (40−10 ms). Since the value of maximum retransmission time is less than the remaining DRX cycle time after the expiration of the inactivity timer, the UE will switch to a sleep mode and flush the HARQ buffer. Thus, energy saving of approximately 10 to 15 percentage is achieved.

Example 2: Energy Saving for a DRX Cycle of 80 ms

Consider a DRX cycle length of 80 ms, an "on" duration timer of 4 ms, and an inactivity timer of 10 ms.

When the max HARQ value is 4, only 3 retransmissions will remain during inactivity expiration. The maximum HARQ retransmission time computed in the manner taught above will be equal to 8*3=24 ms. Next, the maximum HARQ retransmission time of 24 ms is compared with the remaining DRX cycle of 70 ms i.e., (80−10 ms). Since the value of the maximum retransmission time is less than the remaining DRX cycle time after the expiration of the inactivity timer, the UE will switch to a sleep mode and flush the HARQ buffer. Thus, energy saving of approximately 9 to 14 percent will be achieved.

Example 3: Energy Saving for a DRX Cycle of 160 ms

Consider a DRX cycle length of 160 ms, an "on" duration timer of 4 ms, and an inactivity timer of 10 ms.

When the max HARQ value is 4, only 3 retransmissions will remain during inactivity expiration. The maximum HARQ retransmission time computed in the manner taught above will be equal to 8*3=24 ms. Next, the maximum HARQ retransmission time of 24 ms is compared with the remaining DRX cycle of 150 ms i.e., (160−10 ms). Since the value of maximum retransmission time is less than the remaining DRX cycle time after the expiration of the inactivity timer, the UE will switch to a sleep mode and flush the HARQ buffer. Thus, energy saving of approximately 5 to 16 percent is achieved.

Example 4: Energy Saving for a DRX Cycle of 320 ms

Consider a DRX cycle length of 320 ms, an "on" duration timer of 4 ms, inactivity timer of 10 ms.

When the max HARQ value is 4, only 3 retransmissions will remain during inactivity expiration. The maximum HARQ retransmission time computed in the manner taught above will be equal to 8*3=24 ms. Next, the maximum HARQ retransmission time of 24 ms is compared with the remaining DRX cycle of 310 ms i.e., (310−10 ms). Since the value of maximum retransmission time is less than the remaining DRX cycle time after the expiration of the inactivity timer, the UE will switch to a sleep mode and flush the HARQ buffer. Thus, energy saving of approximately 5 to 12 percent is achieved.

Although embodiments of the present disclosure have been described in detail herein, it should be clearly understood that many variations and modifications of the present disclosure herein described, which may appear to those skilled in the art, will still fall within the spirit and scope of the of the present disclosure as defined in the appended claims and their equivalents.

What is claimed is:

1. A method performed by a user equipment (UE), the method comprising:
    transmitting uplink data to a network and storing the uplink data in an uplink hybrid automatic repeat request (HARQ) buffer of the UE, wherein an inactivity timer is activated at a start of the transmission of the uplink data;
    receiving an acknowledgment (ACK) from the network for receipt of the transmitted uplink data;
    measuring a maximum HARQ retransmission time at the UE after receiving the ACK;
    comparing the measured HARQ retransmission time with a remaining discontinuous reception (DRX) cycle time of the UE and determining a link state of the UE;
    switching, after expiration of the inactivity timer, the UE to a sleep mode and removing the uplink data from the uplink HARQ buffer when the HARQ retransmission time is less than the remaining DRX cycle time and the link state of the UE is less than a threshold value; and switching, after the expiration of the inactivity timer, the UE to a sleep mode when the HARQ retransmission time is greater than the remaining DRX cycle time of the UE and the link state of the UE is less than the threshold value.

2. The method of claim 1, further comprising removing, after expiration of the measured HARQ retransmission time or after a new data indicator (NDI) bit toggle is received for a same process identifier (ID) and after the UE is switched to an active mode in a next DRX active occasion, the uplink data from the uplink HARQ buffer when the HARQ retransmission time is greater than the remaining DRX cycle time and the link state of the UE is less than the threshold value.

3. The method of claim 1, further comprising monitoring a physical downlink control channel (PDCCH) until the expiration of the inactivity timer; and switching, after the expiration of an inactivity timer, the UE to a sleep mode and removing the uplink data from the uplink HARQ buffer when the HARQ retransmission time is less than the remaining DRX cycle time and the link state of the UE is greater than the threshold value.

4. The method of claim 1, further comprising removing, after expiration of the measured HARQ retransmission time or after a new data indicator (NDI) bit toggle is received for the same process identifier (ID), the uplink data from the uplink HARQ buffer in a next DRX active occasion when the HARQ retransmission time is greater than the DRX cycle time and the link state of the UE is greater than the threshold value.

5. The method of claim 1, wherein the link state of the UE is based on a link quality metric that is associated with probability that a UE misdetection of a negative ACK (NACK) transmitted from the network as the ACK.

6. The method of claim 5, wherein the link quality metric is determined based on at least one of reference signal received power (RSRP), signal to interference noise ratio (SINR), power headroom (PHR), and block error rate (BLER).

7. The method of claim 5, wherein the link quality metric is an integer ranging from 0 to 4.

8. The method of claim 1, wherein the uplink data is transmitted in response to a reception of a physical downlink control channel (PDCCH).

9. An apparatus for wireless communication, the apparatus comprises:
a processor configured to:
transmit uplink data to a network and store the uplink data in an uplink hybrid automatic repeat request (HARQ) buffer of a user equipment (UE), wherein an inactivity timer is activated at a start of the transmission of the uplink data;
receive an acknowledgment (ACK) from the network for receipt of the transmitted uplink data;
measure a HARQ retransmission time required to retransmit the uplink data to the network after receiving the acknowledgment;
compare the measured HARQ retransmission time with a remaining discontinuous reception (DRX) cycle time of the UE and determine a link state of the UE;
switch, after expiration of the inactivity timer, the UE to a sleep mode and remove the uplink data from the uplink HARQ buffer when the HARQ retransmission time is less than the remaining DRX cycle time and the link state of the UE is less than a threshold value; and
switch, after the expiration of the inactivity timer, the UE to a sleep mode when the HARQ retransmission time is greater than the remaining DRX cycle time of the UE and the link state of the UE is less than the threshold value.

10. The apparatus of claim 9, wherein the processor is further configured to remove, after expiration of the measured HARQ retransmission time or after a new data indicator (NDI) bit toggle is received for a same process identifier (ID) and after the UE is switched to an active mode in a next DRX active occasion, the uplink data from the uplink HARQ buffer when the HARQ retransmission time is greater than the remaining DRX cycle time and the link state of the UE is less than the threshold value.

11. The apparatus of claim 9, wherein the processor is further configured to monitor a physical downlink control channel (PDCCH) until the expiration of the inactivity timer, and switch, after the expiration of the inactivity timer, the UE to a sleep mode and remove the uplink data from the uplink HARQ buffer when the HARQ retransmission time is less than the remaining DRX cycle time and the link state of the UE is greater than the threshold value.

12. The apparatus of claim 9, wherein the processor is further configured to remove, after expiration of the measured HARQ retransmission time or after a new data indicator (NDI) bit toggle is received for a same process identifier (ID), the uplink data from the uplink HARQ buffer in a next DRX active occasion when the HARQ retransmission time is greater than the DRX cycle time and the link state of the UE is greater than the threshold value.

13. The apparatus of claim 9, wherein the link state of the UE is based on a link quality metric that is associated with a probability that a UE misdetection of a negative acknowledgement (NACK) transmitted from the network as an ACK.

14. The apparatus of claim 13, wherein the link quality metric is determined based on at least one of reference signal received power (RSRP), signal to interference noise ratio (SINR), power headroom (PHR), and block error rate (BLER).

15. The apparatus of claim 13, wherein the link quality metric is an integer ranging from 0 to 4.

16. The apparatus of claim 9, wherein the uplink data is transmitted in response to a reception of a physical downlink control channel (PDCCH).

* * * * *